United States Patent [19]

Shingu

[11] Patent Number: 4,623,202
[45] Date of Patent: Nov. 18, 1986

[54] NON-LINEAR CONTROL TYPE MAGNETIC BEARING

[75] Inventor: Shitta Shingu, Tokyo, Japan

[73] Assignee: Kabushiki Kaisha Toshiba, Kawasaki, Japan

[21] Appl. No.: 736,858

[22] Filed: May 22, 1985

[30] Foreign Application Priority Data

Jul. 11, 1984 [JP] Japan ................. 59-143981

[51] Int. Cl.⁴ ............................................. F16C 39/06
[52] U.S. Cl. .................................................. 310/90.5
[58] Field of Search .................. 308/10; 361/143, 146; 74/5.46

[56] References Cited

U.S. PATENT DOCUMENTS

| 3,090,239 | 5/1963 | Dacus | 308/10 |
| 3,785,709 | 1/1974 | Atkinson | 308/10 |
| 3,787,100 | 1/1974 | Habermann | 308/10 |
| 4,078,436 | 3/1978 | Staats | 308/10 |

FOREIGN PATENT DOCUMENTS 2537597 3/1977 Fed. Rep. of Germany ........ 308/10

OTHER PUBLICATIONS

P. Poubeau, Aerospatiale; France, A Magnetic Suspension with Passive Radial Centering for Satellite Flywheel and Kinetic Energy Storage System, pp. 156-179.

"Theoretical Basis of Technical Cybernetics" & Synthesis of Optimal Quick-Action Line System; Publisher: Nawka; Moscow, 1966.

Primary Examiner—R. Skudy
Attorney, Agent, or Firm—Oblon, Fisher, Spivak, McClelland & Maier

[57] ABSTRACT

A non-linear control type magnetic bearing comprises a pair of electromagnets for magnetically attracting an object so as to permit it to be levitated therebetween, a current supply circuit for alternately supplying an excitation current to the pair of electromagnets, a circuit for generating a pair of current level signals corresponding to the levels of the currents through the respective electromagnets, a velocity sensor for generating a velocity signal corresponding to a velocity with which the object is moved, a difference circuit for generating a difference signal corresponding to a pair of current level signals, a differentiating circuit for differentiating the velocity signal to generate an acceleration signal corresponding to the acceleration rate of the object, an analog operating circuit for generating a position displacement signal corresponding to the position of displacement of the object by substituting a difference signal and acceleration signal into an equation of motion of the object, and a switching discriminator circuit for identifying a positive or a negative sign of a linear equation of the position displacement signal and velocity signal and for supplying to a current supply circuit a switching signal which alternately switches a supply of current to the respective electromagnets.

7 Claims, 16 Drawing Figures

NON-LINEAR CONTROL TYPE MAGNETIC BEARING

BACKGROUND OF THE INVENTION

This invention relates to a magnetic bearing used, for example, in a magnetically levitating apparatus and, in particular, a non-linear control type magnetic bearing.

A variety of magnetic bearings utilizing the attractive force of electromagnets have recently been developed, but this type of magnetic bearing is, in general, very expensive, since a position displacement sensor and power amplifier necessary for magnetic bearings are much higher in cost and greater in dissipation power. If these drawbacks are overcome, then it may be considered that such magnetic bearings having a contactless, non-friction and oilless feature will find a wider range of practical application.

In the field of a linear control method, a magnetic bearing has already been implemented and commercialized which utilizes a velocity sensor using an inexpensive, easy-to-manufacture search coil in place of the expensive position displacement sensor. It is disclosed in, for example, "Magnetic Suspension with Passive Radial Centering for Satellite Flywheel and Kinetic Energy Storage Systems", the Third International Workshop on Rare Earth-Cobalt Permanent Magnets and Their Applications, June 27 to 30, 1978 by P. C. Poubeau. This system also has advantages as a "zero-power" system and has already been established as such. However, this system has a drawback that it cannot start to levitate an object from an at-rest position. For this reason, an extra lift-off circuit is provided so as to levitate the object. It is therefore necessary to provide another sensor corresponding to the position displacement sensor. This is a substantial bar to a wide acceptance of this system.

A general non-linear type control theory is disclosed in "Theoretical Basis of Technical Cybernetics" and "Optimal Quick-Action Line System", 1966. However, this theory has not been applied to magnetic bearings so far.

SUMMARY OF THE INVENTION

An object of this invention is to provide a non-linear control type magnetic bearing which obviates the necessity of providing any expensive position displacement sensor and power amplifier.

Another object of this invention is to provide a non-linear control type magnetic bearing which can start to levitate an object from an at-rest position.

Another object of this invention is to provide a non-linear control type magnetic bearing requiring a less power dissipation.

The essence of this invention resides in that, in the non-linear control type magnetic bearing, the displacement of an object to be levitated is found based on the output signal of a velocity sensor and excitation current of electromagnets without the necessity of providing any expensive position displacement sensor and the need of using any expensive power amplifier is eliminated by a pair of electromagnets excited alternately.

A non-linear control type magnetic bearing according to this invention comprises (a1) a pair of mutually opposite electromagnets, sandwiching an object to be levitated therebetween with a gap left between the electromagnet and the object, for attracting the object under their magnetic force; (a2) current supply means for alternately supplying excitation current to the respective electromagnets; (a3) a means for detecting the level of current flowing through the respective electromagnet and for generating a pair of current level signals; (a4) a velocity sensor for detecting a velocity with which the object to be levitated is moved in a direction in which the pair of electromagnets face each other and for generating a velocity signal; (a5) difference means for finding a difference between the pair of current level signals and for generating a difference signal; (a6) differentiating means for differentiating the velocity signal and for determining an acceleration rate of the object to generate an acceleration signal; (a7) analog operation means for performing an analog operation on an equation of motion of the object with the use of the difference signal and acceleration signal to find a position displacement of the object and for generating a position displacement signal; and (a8) switching discriminator means for identifying a positive or a negative sign of a linear equation of the position displacement signal and velocity signal and for supplying to the current supply means a switching signal for alternately switching a supply of current to the pair of electromagnets.

The above-mentioned non-linear control type magnetic bearing essentially possesses a levitation start function and thus implements an energy-saving effect analogous to a zero-power system. Furthermore, the magnetic bearing also performs a lift-off function in the gravitational field. Even if as a switching element use is made of a transistor, a switching amplifier can be compactized as it utilizes the switching amplifying principle in which the transistor is operated constantly at a minimum heat-generating region. This arrangement obviates the need of providing any expensive position displacement sensor and power amplifier. Therefore, an inexpensive magnetic bearing can be readily implemented having a contactless, non-friction and oilless feature.

BRIEF DESCRIPTION OF THE DRAWINGS

The other objects and advantages will be apparent from the following description taken in conjunction with the accompanying drawings in which.

DETAILED DESCRIPTION OF THE PREFERRED EMBODIMENTS

Figure 1:
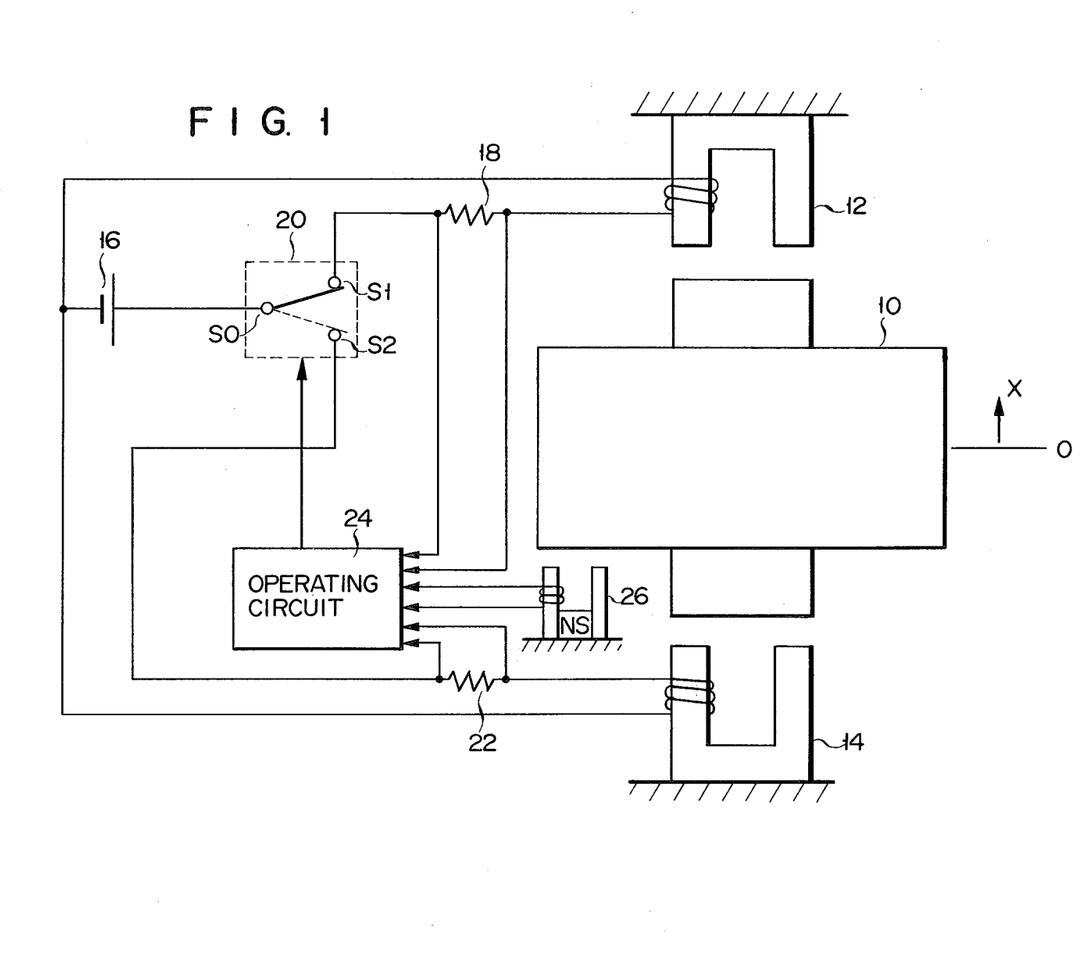
FIG. 1 is a schematic diagram showing a non-linear control type magnetic bearing according to a first embodiment of this invention.

The non-linear control type magnetic bearing according to the first embodiment of this invention will be explained below by referring to FIGS. 1 and 2.

First and second electromagnets 12 and 14 are arranged opposite to each other in a manner to sandwich an object 10 therebetween with a gap left there. Coils of the first and second electromagnets 12 and 14 are connected at one end to one terminal of a power supply 16. The coil of the first electromagnet 12 is connected at the other end to an S1 terminal of a changeover switch 20 through a first resistor 18 for current detection and the coil of the second electromagnet 14 is connected at the other end to an S2 terminal of the changeover switch 20 through a second resistor 22 for current detection. An S0 terminal of the changeover switch 20 is connected to the other terminal of the power supply 16. The first electromagnet 12 is excited with the S1 terminal of the changeover switch 20 in the ON state and the second electromagnet 14 is excited with the S2 terminal of the changeover switch 20 in the ON state. That is, the first and second electromagnets 12 and 14 are excited alternately. In this connection it is to be noted that the changeover switch 20 is comprised of, for example, a transistor as a switching element.

Voltages across the first and second resistors 18 and 22 for current detection are supplied, as current level signals iA and iB, to an operating circuit 24. A velocity sensor 26 comprised of, for example, a search coil is disposed opposite to the lower surface of the object 10. The velocity with which the object 10 is moved up and down is detected by the velocity sensor 26 and a velocity signal dx/dt is supplied to the operating circuit 24.

Figure 2:
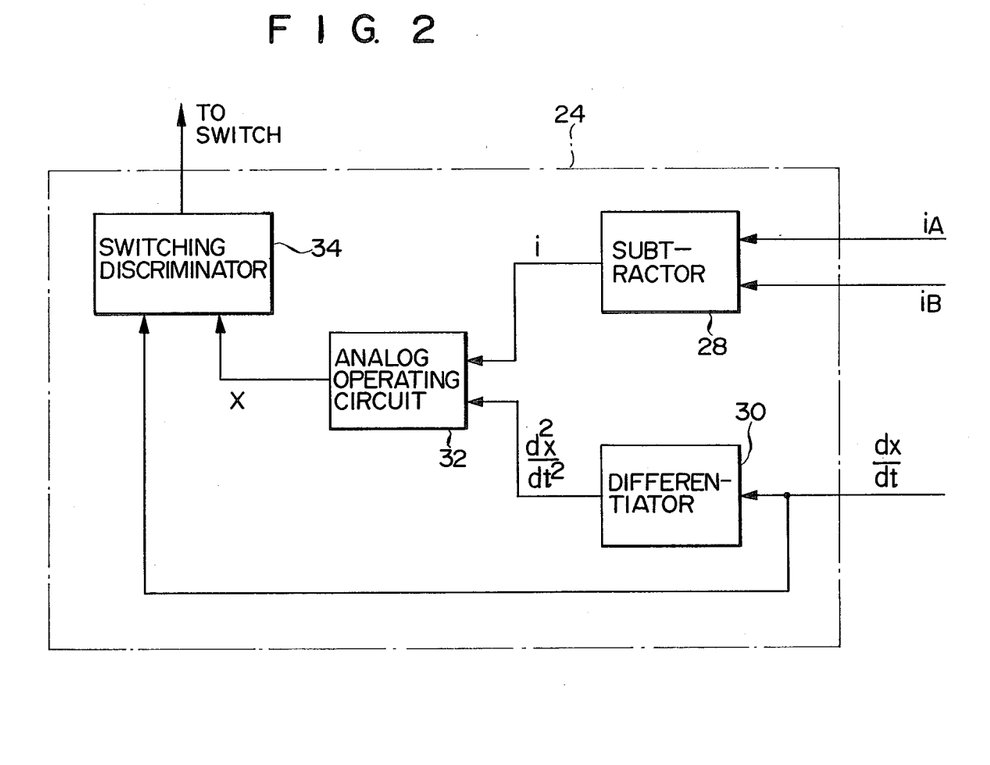
FIG. 2 is a block diagram showing an operating circuit of the first embodiment of this invention.

The operating circuit 24 is comprised of a subtracter 28, differentiator 30, analog operating circuit 32 and switching discriminator 34, as shown in FIG. 2. The current level signals iA and iB detected are delivered to the subtracter 28 where a calculation of i=iA−iB is carried out. A difference signal i as an output of the subtracter 28 is supplied to the analog operating circuit 32. A velocity signal dx/dt which is detected at the velocity sensor 26 is supplied to the differentiator 30 where it is differentiated. The differentiated signal is supplied as the acceleration signal $d^2x/dt^2$, together with the current level signal, to the analog operating circuit 32. In the analog operating circuit 32, the current level signal i and acceleration signal $d^2x/dt^2$ are substituted into the equation of motion of the object 10 to effect an analog operation and thus to produce a position displacement signal x of the object 10. The position displacement signal x is supplied, together with the velocity signal dx/dt, to the switching discriminator 34. The switching discriminator 34 identifies the positive or negative sign of a linear equation for the position displacement signal and velocity signal, and supplies to the changeover switch 20 a switching signal which alternately switches a supply of current to the electromagnets. It is to be noted that an origin 0 in the position displacement of the object is determined to be located at an equilibrium point of the object 10 as shown in FIG. 1.

The function and operation of the magnetic bearing of this invention will be explained below.

First, an explanation will be given of the optimal control theory in general. A force acting on the object 10 is comprised of a gravitational force and electromagnetic force. Now suppose only the electromagnetic force with the gravitational force disregarded here. Then, the equation of motion of the object 10 is given below:

$$m\frac{d^2x}{dt^2} = M(x) \cdot I^2 \tag{1}$$

where m: the mass of the object 10 to be levitated; and

M(x): the function of the displacement x including the coil impedance of the electromagnet.

Differentiating the velocity signal dx/dt of the velocity sensor 26 yields an acceleration $d^2x/dt^2$. The current levels on the respective electromagnets 12 and 14 can be normally measured. M(x) is found through the use of Equation (1). Since the function of M(x) is known beforehand, it is possible to evaluate the displacement x. In this way, the displacement x is evaluated from the current level I and velocity dx/dt. In order to determine the switching timing of the changeover switch 20 through the use of the displacement x and velocity signal dx/dt, use is made of the optimal control theory. According to the optimal control theory, the switch changeover discriminant for minimum time control of movement of the object in a field of motion of an equation:

$$m\frac{d^2x}{dt^2} = f \text{ or } -f \tag{2}$$

is given by:

$$F(x, dx/dt) = m\,dx/dt\,|dx/dt| + fx = 0 \tag{3}$$

Thus, the optimal control is realized if switching is effected to f at F(x, dx/dt)≧0 or −f at F(x, dx/dt)<0. Here, f represents a constant.

In this way it is possible to realize the optimal control in general. However, if the above-mentioned theory applies, the right-handed side of Equation (1) is not a constant, but a function for the current level and position, presenting a problem. For convenience, let us now consider a bearing system satisfying, in place of Equation (1), the following equation:

$$m\frac{d^2x}{dt^2} = \alpha x + \beta I \tag{4}$$

This equation is obtained in the cases where permanent magnets are used also as electromagnets and where the attractive force of the electromagnet is linearized for the current level I. The essence of this invention is not affected even if Equation (4) is used in place of Equation (1). A subsequent explanation will be made based on this fact. The current level I flowing upon the application of a voltage e across the electromagnets 12 and 14 is given by:

$$e = RI + L\frac{dI}{dt} \tag{5}$$

where
R: the resistance of the coil,
L=L(x): the inductance of the coil.

Since, in general, the coil has an inductance, the current level reveals a time lag. The following explanation is based on the assumption that there is, as an ideal state, no time delay of the current. If Equation (4) is integrated once with L=0 and I=±I0 (constant), then an equation:

$$G(x, dx/dt) = m\left(\frac{dx}{dt}\right)^2 - \alpha x^2 - \beta I0 |x| = 0 \tag{6}$$

is obtained as an optimal switching discriminant.

A control system of a smaller extent of delay and control system of a greater extent of delay were simulated using Equation (6). FIGS. 3A and 3B and FIGS. 4A and 4B show the loci of the simulations in the phase plane.

Figure 3A:
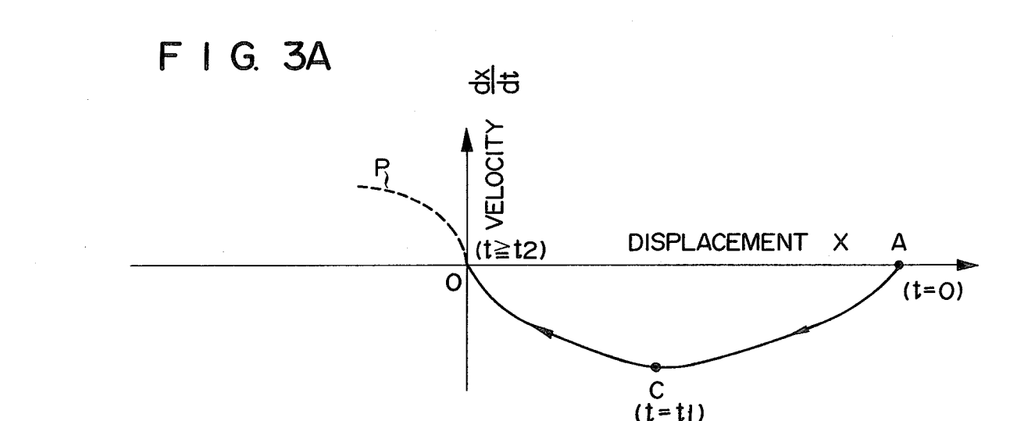
FIGS. 3A and 3B are graphs showing a relation of a velocity dx/dt to an object displacement x and a relation of excitation current through an electromagnet coil to a time t when the non-linear control type magnetic bearing is operated with the use of a special switching discriminant.
Figure 3B:
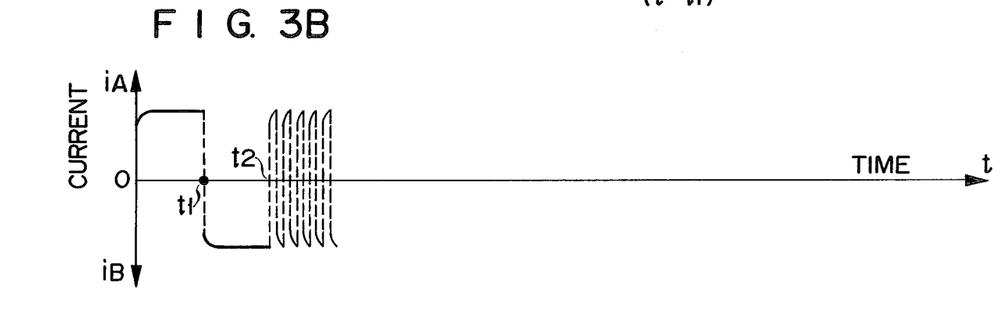

When the coil has a small time constant (L/R) and then a time delay of the current is small, the changeover switch 20 is switched to the S1 side at an initial level point A to permit the energization of the electromagnet 12 as shown in FIG. 3A. At the level point C, the changeover switch 20 is switched to the S2 side to permit the energization of the electromagnet 14. Thereafter, the displacement x of the object immediately reaches a target position 0 and thus an optimal control is realized with minimum time. This will be also well understood from the current level variation of the electromagnets 12 and 14 as shown in FIG. 3B. After the displacement x of the object has arrived at the 0 point, this state (the 0 state) is maintained by the frequent switching operations. However, this system is not suitable for a smaller electric power, because the maximum current normally flows through either of the electromagnets 12 ad 14. In FIG. 3A, it is to be noted that the broken line P represents a switching curve and that the time t1 corresponds to the point C.

Figure 4A:
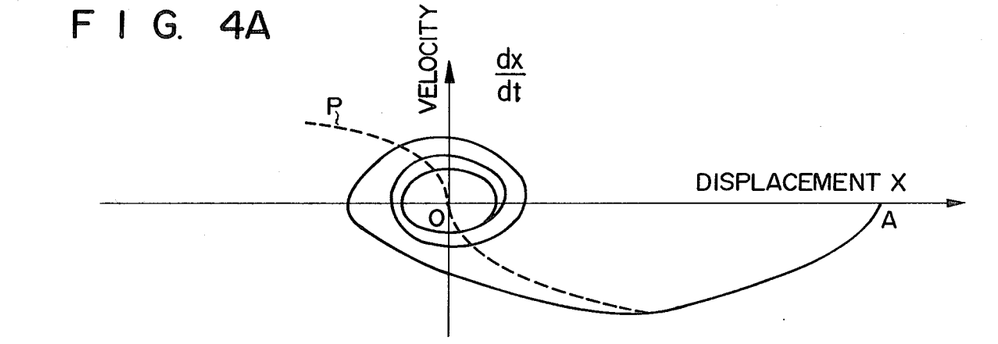
FIGS. 4A and 4B are graphs showing a relation between the object displacement x and the velocity (dx/dt) and relation of excitation current through the electromagnet coil to a time t when the non-linear control type magnetic bearing is operated with the use of another special switching discriminant.
Figure 4B:
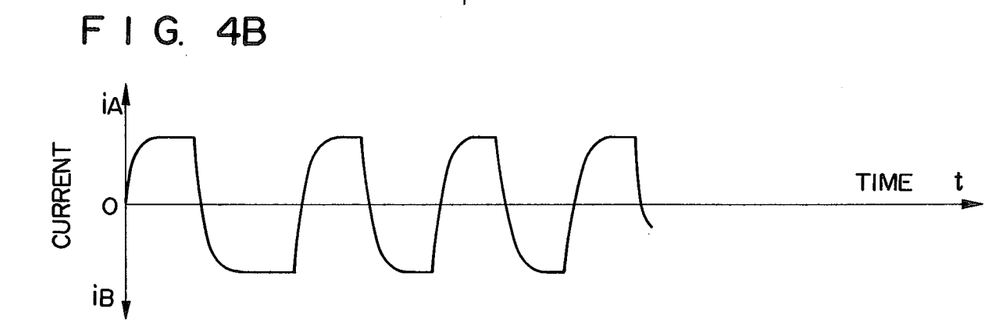

FIGS. 4A and 4B show the operation of the object 10 and the time variation of a current through the coil of the electromagnet (12, 14) when the time constant (T=L/R) of the coil of the electromagnets is greater (L>>R>0) and thus the time delay of the current is greater. In this case, use is made of the same switching curve P as shown in FIG. 3. This system is subject to an adverse influence resulting from the time delay of the current and thus a final limit cycle is involved, causing a greater vibration and positioning error. In other words, this system is not practical due to the involving of the limit cycle.

Figure 5A:
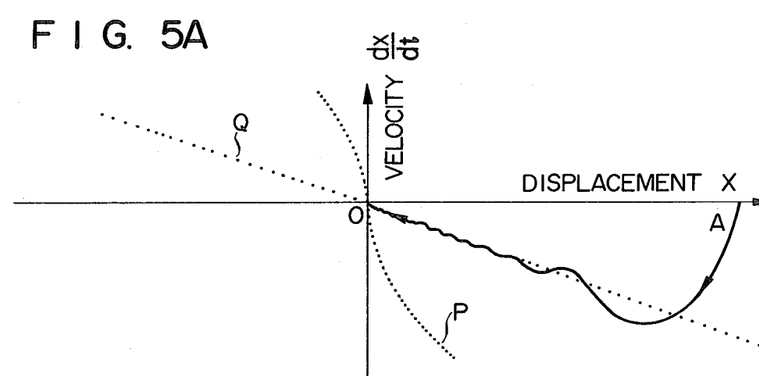
FIGS. 5A to 5D show graphs a relation of the object displacement x to the velocity dx/dt, a relation of the velocity dx/dt to the acceleration $d^2x/dt^2$, a relation of the displacement x and estimated displacement y to the time t, and a relation of excitation current through the electromagnet coil to the time t, when the non-linear control type magnetic bearing, according to this invention, is operated under no disturbance with the use of the switching discriminant.

According to this invention, these problems are solved through the positive utilization of the phenomenon (FIGS. 3A and 3B and FIGS. 4A and 4B) which results from the time delay of the current level. That is, the embodiment of this invention adopts a switching line Q with a limited gradient with respect to an origin 0 as shown in FIG. 5A. In FIG. 5A, the switching curve P is shown for guidance only and can be derived from Equation (6). This is of the same type as shown in FIGS. 3A and 4A. The switching curve P has an infinite gradient at the origin 0 and is different from the switching curve Q in this embodiment. Here, the switching curve Q becomes a linear function for the displacement x and velocity signal dx/dt and thus is represented as follows:

$$H(x, dx/dt) = \gamma x + \delta \frac{dx}{dt} \tag{7}$$

Figure 5B:
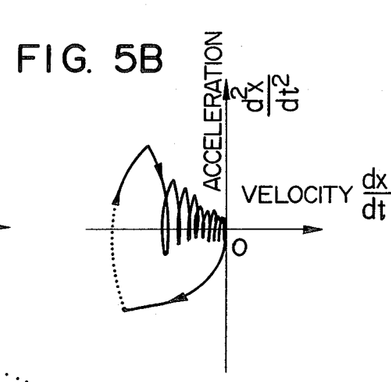
Figure 5C:
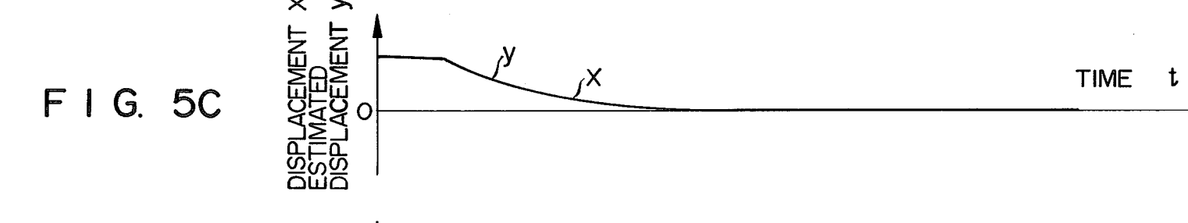
Figure 5D:
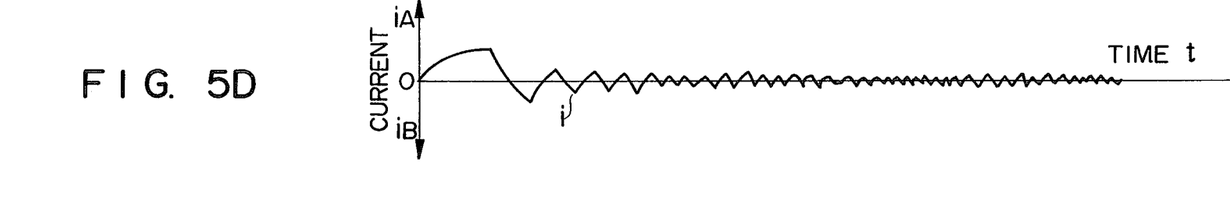

Using the displacement signal x from the analog operating circuit 32 and velocity signal dx/dt from the velocity sensor 26, the positive or negative sign of H(x, dx/dt) is judged at the switching discriminator 34. With H(x, dx/dt) at the positive sign the terminal S2 of the changeover switch 20 is rendered ON and with H(x, dx/dt) at the negative sign the terminal S1 is rendered ON. In consequence, as shown in FIG. 5A the displacement of the object 10 converges from an initial level at a point A to a target level at the point 0, leaving no limit cycle behind. FIG. 5B shows a relation of the velocity signal dx/dt to the acceleration signal d²x/dt². From this figure it is found that the object 10 converges toward an equilibrium point 0. FIG. 5C shows a relation of the displacement x of the object to the time t. From FIG. 5C it is also found that the displacement of the object 10 converges toward the equilibrium point 0. FIG. 5D shows a variation of excitation currents iA, iB to the time t. From a comparison between FIG. 5D and FIGS. 3B and 4B, it will be appreciated that the system of this embodiment needs a very small level of excitation current. Therefore, the embodiment of this invention, though being somewhat lower in response characteristics, can achieve a stability and a small power dissipation of practical importance. Furthermore, since the switching discriminant H(x, dx/dt) is the linear function of the displacement x and velocity signal dx/dt, it is possible to very readily effect an analog composition. The value y in FIG. 5C is an estimated value of the control system which is obtained by finding the position of the object through the use of the equation of motion (1) under the assumption that there is no disturbance. The actual displacement x of the object 10 is in agreement with the estimated value y, provided that there is no disturbance.

An explanation has so far been made as to the embodiment of this invention under the assumption that there is no disturbance. Now an explanation will be given below with reference to FIGS. 6A through 6E where the system of this invention is put under, for example, the gravitational field.

Figures 6A, 6B, 6C:
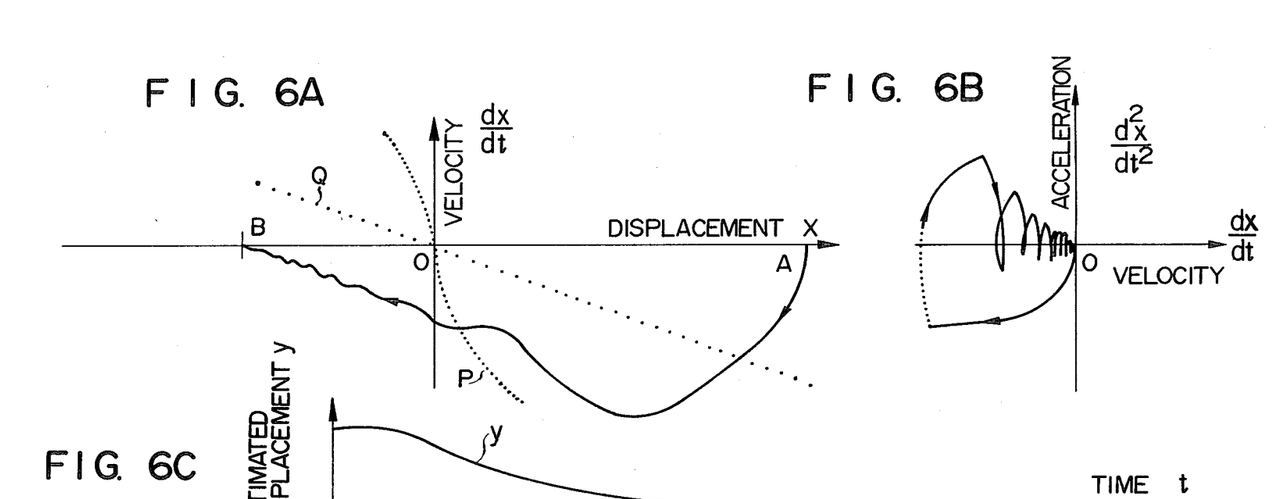
FIGS. 6A to 6E are graphs showing a relation of the object displacement x to the velocity dx/dt, a relation of the velocity dx/dt to the acceleration $d^2x/dt^2$, a relation of the estimated displacement y to the time t, a relation of the displacement x to the time t, and a relation of excitation current through the electromagnet coil to the time t, when the non-linear control type magnetic bearing is operated under the gravitational field as a disturbance using the switching discriminant according to this invention.
Figure 6D:
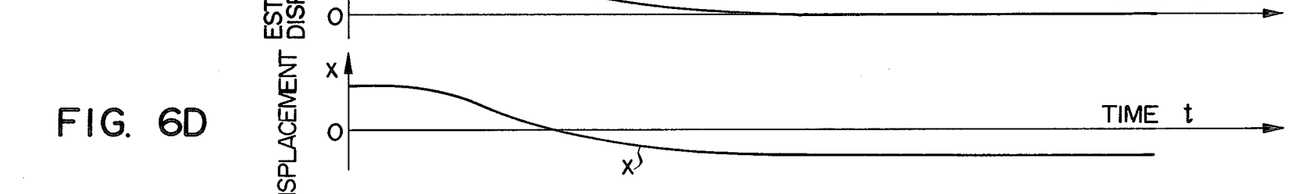
Figure 6E:
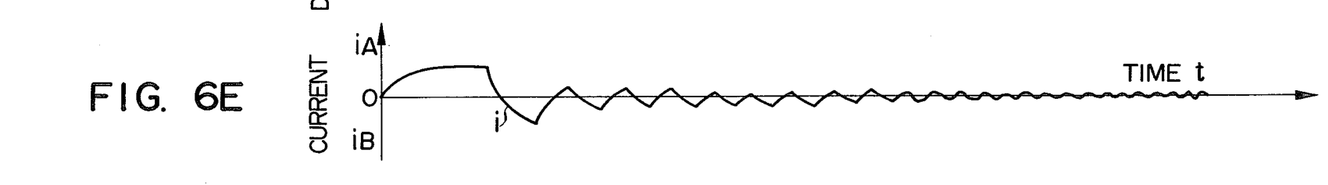

In this case, the object 10 is automatically moved to a position B where, as shown in FIG. 6A, the electromagnetic force of the electromagnets 12 and 14 and gravity are in static equilibrium, with the result that the object 10 is maintained at the position B. FIG. 6B shows a relation of the velocity dx/dt to the acceleration d²x/dt². As shown in FIG. 6C, the estimated value y of the control system varies with the time t and the object 10 reaches an equilibrium point as shown in FIG. 6D. The excitation current of the coils varies as shown in FIG. 6E. It is to be noted that the ON time of the electromagnet 12 is somewhat longer than that of the electromagnet 14.

As evident from FIG. 6E, the dissipation current makes no appreciable difference even in the presence of the disturbance as compared with that in the absence of it. This is a marked advantage which can be obtained from the system of this invention.

According to this invention, the object 10 can be magnetically levitated by controlling the changeover switch 20 using a switching discrimination signal generated in the operating circuit 24. In this case, the currents through the electromagnets 12 and 14 are reduced to a very small level due to the impedance of the coils, thus involving a very small dissipation power. Therefore, the non-linear control type magnetic bearing of low cost can be implemented without the need of providing any expensive position displacement sensor and power amplifier.

Figure 7:
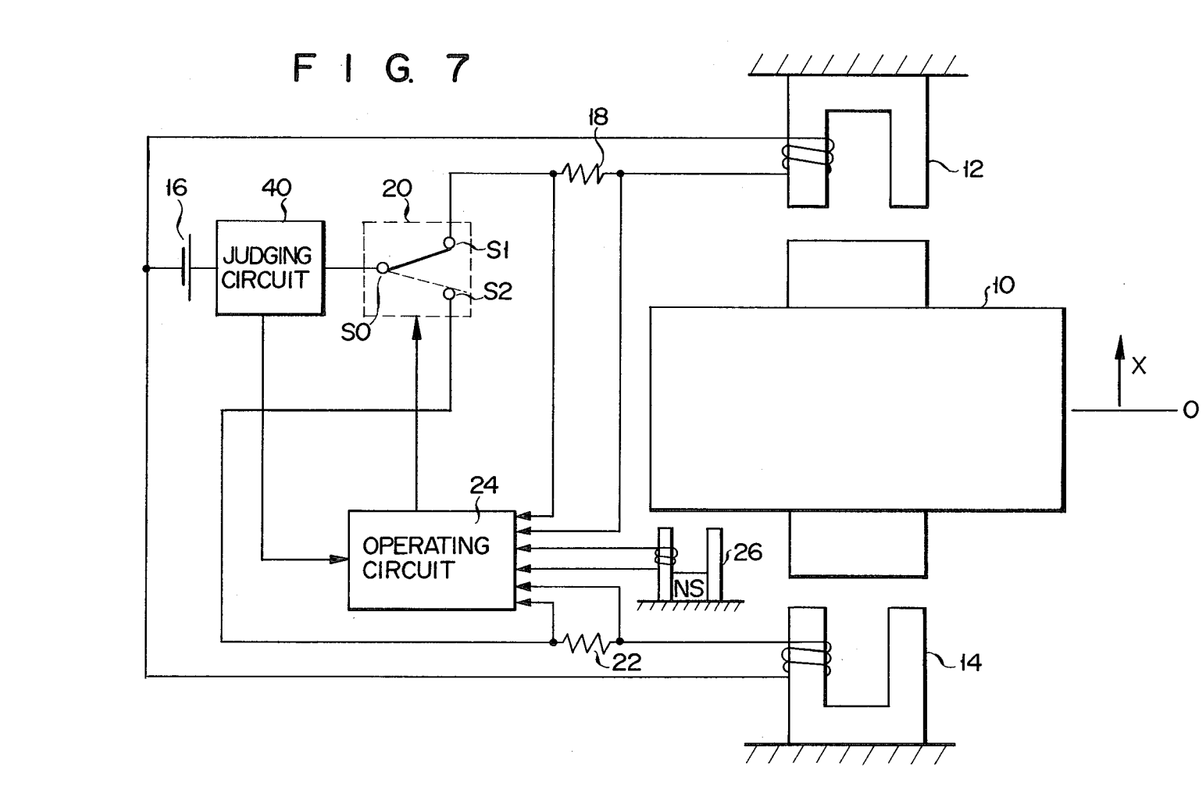
FIG. 7 is a schematic diagram showing a non-linear control type magnetic bearing according to a second embodiment of this invention.
Figure 8:
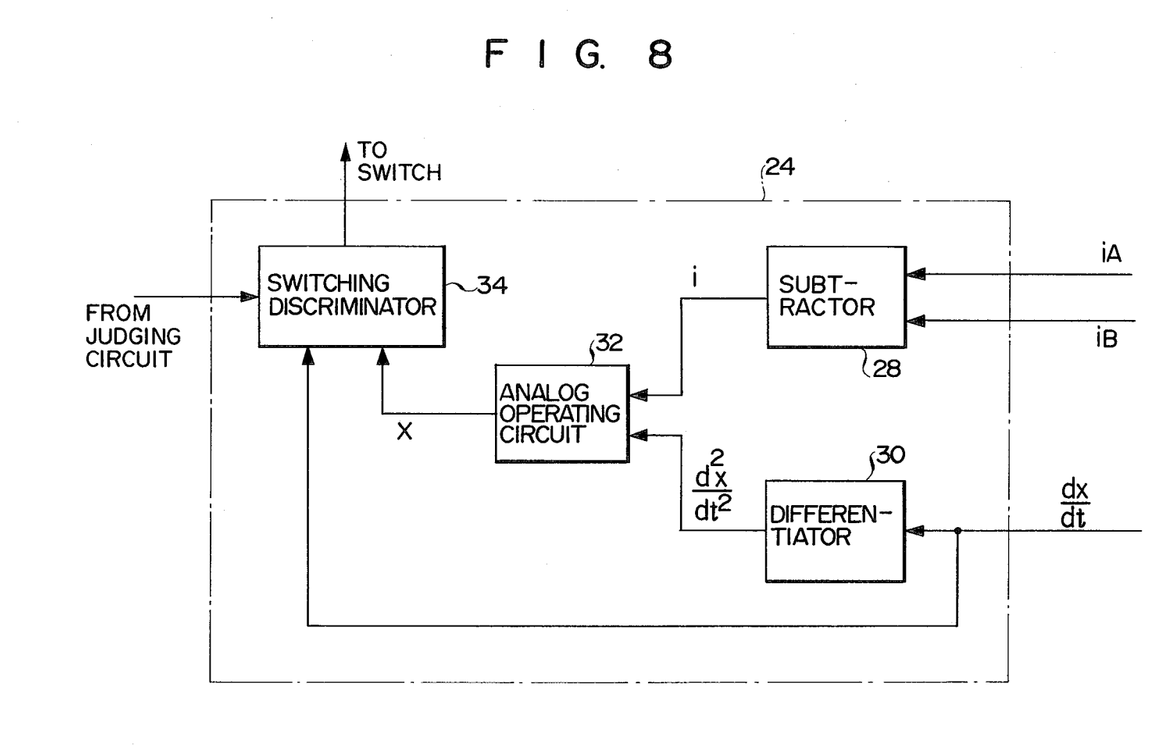
FIG. 8 is a block diagram showing an operating circuit of the second embodiment of this invention.

A non-linear control type magnetic bearing according to a second embodiment of this invention will be explained below by referring to FIGS. 7 and 8.

In this embodiment, a judging circuit 40 is connected between a terminal S0 of a changeover switch 20 and the end of a power supply 16 and adapted to judge whether or not the current from the power supply 16 continues for over a predetermined period of time at maximum. The judgment data is supplied to a switching discriminator 34 in an operating circuit 24. The object 10 can surely be levitated from an at-rest position under the action of the judging circuit 40 and operating circuit 24. The other arrangement of this embodiment is the same as that of the first embodiment of this invention. Therefore, further explanation is omitted.

The operation of the second embodiment will be explained below. Now suppose that, at rest, the object 10 is located, for example, on the side of the electromagnet 14 and the changeover switch 20 is placed on the side of the S2 terminal. Then, since the output of the velocity sensor 26 is 0, no immediate switching occurs at the changeover switch 20. During this time period, a maximum current continuously flows through the electromagnet 14 and the judging circuit 40 judges this state. The judgment data is supplied to the switching discriminator 34, causing the changeover switch 20 to be forcedly switched to the S1 terminal of the switch 20. Thereafter, the object 10 is automatically moved to a position 0 in the same way as explained in connection with FIGS. 6A through 6E, and starts to be levitated.

This invention is not restricted to the above-mentioned embodiments. For example, a power relay may be used as the changeover switch in place of the transistor. The judging circuit 40 is not required to be connected between the power supply 16 and the changeover switch 20, and may be placed anywhere in the associated circuit so long as it can judge that maximum current flows through either of the electromagnets 12, 14 for over a predetermined period of time. Various changes or modifications can be made within the spirit and scope of this invention.

What is claimed is:

1. A non-linear control type magnetic bearing comprising:
    a pair of electromagnet means, disposed opposite to each other in a spaced-apart relation with an object to be levitated therebetween, for attracting the object under their magnetic force;
    current supply means for alternately supplying excitation current to the respective electromagnets;
    means for detecting the levels of the currents flowing through the respective electromagnets and for generating a pair of current level signals;
    velocity sensor means for detecting the velocity with which the object is moved in the mutually opposite directions of the electromagnets and for generating a velocity signal;
    difference means for finding a difference between the pair of current level signals and for generating a difference signal;
    differentiating means for differentiating the velocity signal and for determining an acceleration rate of the object to generate an acceleration signal;
    analog operation means for performing an analog operation on an equation of motion of the object through the use of the difference signal and acceleration velocity signal to find a position displacement of the object and for generating a position displacement signal; and
    switching discriminator means for judging a positive or a negative sign of a linear equation for the position displacement signal and velocity signal and for supplying to the current supply means a switching signal which alternately switches a supply of a current to the respective electromagnets.

2. A magnetic bearing according to claim 1, in which said current supply means comprises:
    a power supply for supplying excitation currents to the pair of electromagnets; and
    switching means for alternately switching a supply of the excitation currents to the respective electromagnets.

3. A magnetic bearing according to claim 2, in which said switching means is comprised of a transistor.

4. A magnetic bearing according to claim 2, in which said switching means is a power relay.

5. A non-linear control type magnetic bearing according to claim 1, further comprising judging means for judging whether or not a predetermined current flows for over a predetermined period of time through one of the pair of electromagnets and for supplying, when a predetermined current continuously flows for over a predetermined period of time, to the switching discriminator means a judgment signal for forcing a current through said one electromagnet to be switched to the other electromagnet.

6. A magnetic bearing according to claim 5, in which said current supply means comprises:
    a power supply for supplying the respective currents to the respective electromagnets; and
    switching means for alternately switching a supply of excitation current to the respective electromagnets.

7. A magnetic bearing according to claim 6, in which said judging means is connected between said power supply means and said switching means.

* * * * *

UNITED STATES PATENT AND TRADEMARK OFFICE
CERTIFICATE OF CORRECTION

PATENT NO. : 4,623,202
DATED : November 18, 1986
INVENTOR(S) : Shitta Shingu

It is certified that error appears in the above-identified patent and that said Letters Patent is hereby corrected as shown below:

On the title page, "16 Drawing Figures" should read

-- 17 Drawing Figures --.

Signed and Sealed this

Third Day of March, 1987

*Attest:*

DONALD J. QUIGG

*Attesting Officer*   *Commissioner of Patents and Trademarks*